United States Patent [19]
Boyer

[11] 3,807,791
[45] Apr. 30, 1974

[54] SAFETY WINDSHIELDS
[75] Inventor: Jean Boyer, Saint-Geours de Maremne, France
[73] Assignee: Hanff-Serres & Cie Societe Auxil, Saint-Geours de Maremne, France
[22] Filed: May 15, 1972
[21] Appl. No.: 253,174

[30] Foreign Application Priority Data
Apr. 10, 1972 France .............................. 72.12544

[52] U.S. Cl. ................... 296/84 K, 49/141, 52/172, 52/616, 219/203, 296/84 R
[51] Int. Cl. .......................... B60j 1/02, E06b 7/12
[58] Field of Search .... 296/84 R, 84 K, 84 E, 95 Q; 49/141; 52/171, 172, 308, 616, 98; 219/203, 522, 308, 616

[56] References Cited
UNITED STATES PATENTS
3,430,394  3/1969  Johnston .......................... 49/466 X
2,022,296  11/1935  Mills .............................. 219/522 X
2,838,810  6/1958  Englehart ............................. 52/172
3,160,338  12/1964  Widman et al, .................. 296/1 R X
2,572,124  10/1951  Eichner ................................. 49/141
1,473,029  11/1923  Faubert et al. ...................... 219/203
3,399,294  8/1968  Thieben ............................. 219/522

Primary Examiner—David Schonberg
Assistant Examiner—Leslie J. Paperner
Attorney, Agent, or Firm—Stephen E. Feldman

[57] ABSTRACT

The invention relates to double windshields for vehicles. To ensure the dislodging of the front outer sheet of these windshields after initiation of breakage, it suffices to give a sharp tug on a handle accessible to the driver and connected to an inextensible cable encircling this sheet. An electrical resistance is advantageously provided to heat the space comprised between the two sheets, which is kept dry and permanently isolated from the outside. The invention is particularly adaptable to an automobile vehicle.

15 Claims, 5 Drawing Figures

SAFETY WINDSHIELDS

The invention relates to safety windshields for vehicles, especially automobiles, which windshields are composed of two parallel sheets of glass spaced from one another.

Such windshields have been proposed to facilitate de-icing of the outer surface and/or de-fogging of the inner surface by causing warm air to circulate in the space comprised between the two sheets.

However, such double windshields have the drawbacks that they have not been usable hitherto for safety purposes by causing the inner sheet to play the role of "safety windshield" after breakage of the outer sheet. In fact, in known constructions of these double windshields, no means has been provided to cause the outer sheet to break into fragments and hence to be dislodged, after initiation of its breakage or of its cracking. Now, since, with these constructions, it was not practical to cause such breaking up speedily by a blow with the fist or elbow because the inner sheet has remained intact, the opacity of the outer sheet resulting from said initiation of breakage could suddenly prevent the driver from seeing the road prior to the stopping of the vehicle. These conditions could cause an accident.

It is an object of the invention to overcome the aforesaid drawbacks of windshields of the type concerned.

It is a further object of the invention to provide a double windshield which meets safety requirements better in the case of breakage of the outer sheet.

Other objects and advantages will be apparent from the description which follows.

The windshield according to the invention is characterised in that its outer sheet is encircled by an inextensible cable, especially of steel, connected to a handle easily accessible to the driver inside the vehicle and mounted so that its sudden traction ensures the dislocation of the outer sheet after initiation of the breakage of the sheet.

In preferred embodiments, recourse is had also to one and/or other of the following features:

The inextensible cable is anchored at a point, of the rigid frame surrounding the windshield, arranged on the side of the frame opposite that side at which the said cable is connected to the handle.

The space comprised between the two sheets of the windshield is isolated permanently from the outside in sealed manner.

An electrical resistance is provided to heat the space comprised between the two sheets of the windshield.

In a windshield according to the preceding paragraph, the electrical resistance is mounted along the frame so as to be thermally isolated from the sealing joints provided between this frame and the sheets of glass.

The invention comprises, apart from these main features, certain other features which are preferably used at the same time and which will be more explicitly considered below.

In order that the invention may be more fully understood, one embodiment of a double windshield according to the invention is described below purely by way of illustrative but non-limiting example, with reference to the accompanying drawing in which.

Figure 3:
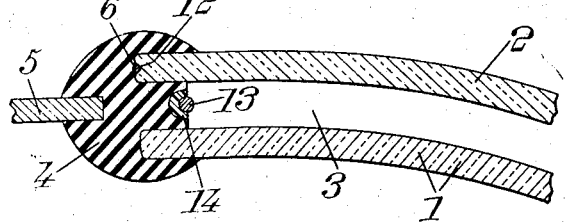
FIG. 3 shows in cross-section the edge of such a windshield, with its support frame, its mounting joint and an electrical heating resistance incorporated in this joint.

The embodiments illustrated, intended for an automobile vehicle, comprise two parallel sheets of glass, namely one 1, behind and inside, and the other 2, in front and outside, separated from one another by a chamber 3 (FIG. 3).

Both of them are mounted, with the interposition of a sealing joint of rubber or other elastomeric material 4 which is preferably common to the two sheets, in a rigid frame 5 forming part of the chassis or the bodywork of the vehicle.

There is also provided an inextensible cable 6 encircling the outer sheet 2.

The cable is connected at a point 7 to an inextensible cord 8 itself connected to a handle 9 arranged inside the vehicle, in a position of the latter where it is easily accessible to one or other hand of the driver.

The point 7 is preferably arranged below to the left of the windshield seen from the inside of the vehicle.

The cord 8 can be constituted by the extension of one of the two runs of the cable 6 ending at the point 7.

The handle 9 can be of any desirable form such as a grip painted red or in any other colour, a pull knob whose head is easily grasped and whose stem remains normally positioned within the left side of the frame of the windshield or in the dashboard, or again a hanging ball.

The path followed by the cord 8 between its point of attachment 7 to the cable 6 and the activating handle 9 is bent by its passage over at least one guide pully or pin.

The cable 6 is preferably anchored, at a place opposite the point 7, at a point 11 of the frame 5 which points is to be found above and to the right of the windshield seen from the inside for the example considered above.

Figure 4:
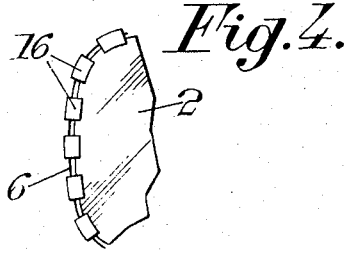
FIG. 4 shows a portion of a windshield according to the invention including a modification of a peripheral element.
Figure 5:
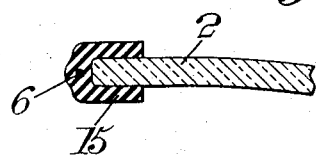
FIG. 5 shows in cross-section another modification of a peripheral element.

In order that the cable 6 can remain directly guided along the periphery of the outer sheet 2 during its actuation, it is advantageous to provide the peripheral portion of this sheet a groove 12 adapted to receive the said cable, or again the said cable is housed in a flexible sectional element 15 (FIG. 5) astride the said peripheral portion or fastened on this portion in any other desirable manner, which sectional element can be continuous or formed of separate links 16 (FIG. 4).

The operation of this cable is as follows:

At normal times and according to a phenomenon of refraction well-known in the field of double glazing, the two transparent sheets give the impression of being fused into a single one.

When the outer sheet 2, as the result of a localised shock or of a sudden difference in pressure or for any other reason, undergoes the initiation of rupture by cracking or partial breakage capable of being manifested by an at least local opacity, it suffices for the driver to give a sharp pull on the handle 9 to completely dislodge this sheet 2.

Figure 1:
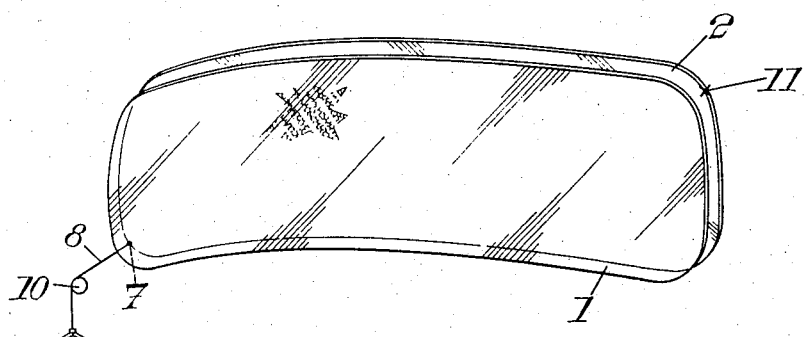
FIG. 1 shows said embodiment of a windshield according to the invention in diagrammatic perspective.
Figure 2:
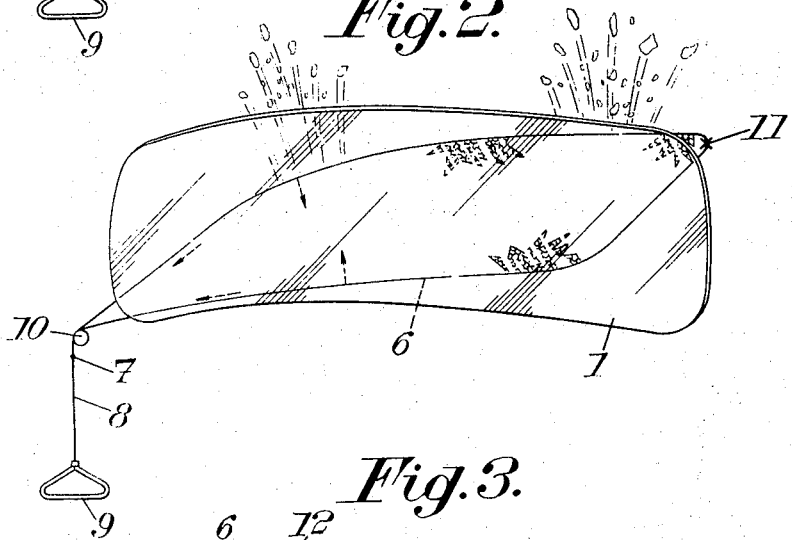
FIG. 2 shows in a similar way the same windshield in the course of the movement causing dislocation of its outer sheet.

In fact, on such a pull, and as clearly seen in FIG. 2, the two rings, below and above, of the cable 6, comprised between the points 7 and 11, have a tendency to approach one another, and hence to urge transversely against one another the fragments of glass broken up by the initiation of rupture thereby causing their "implosion" or bursting.

The sensitivity of the sheet 2 to this type of bursting is all the more marked as the curvature of the windshield is itself more pronounced, considering that this curvature already mutually inclines certain of the glass fragments to be ejected in the direction corresponding to their mutual separation by breakage.

It should be noted also that this operation of dislocation is facilitated by the vibrations or shaking to which the windshield is permanently subject, due to the fact that the vehicle progresses, the only case in which the risk of accident, which the invention is designed to avoid, is truly manifested.

The outer sheet is thus reduced to fragments very easily and very rapidly.

There results therefrom the two following advantages:

On the one hand the destruction of the outer sheet only reduces the visibility of the driver for a very brief time, for example of the order of a second, which eliminates risk of accidents due to prolonged lack of visibility.

On the other hand the intact inner sheet serves as a safety windshield and enables the driver and the possible other passengers of the vehicle to continue driving without handicap. This can have considerable advantages, particularly in rainy weather, in intense cold, or when the purpose of the journey concerned is important and urgent.

In the preferred embodiments, instead of the chamber 3 being easily placeable in communication with the outside, for the purposes especially of sweeping it with air heated in an enclosure external to the windshield, said chamber is kept strictly isolated from the outside by means of suitable joints, rigid or not, and contains a dry gas such as dry air. A dehydrating product is capable of being inserted permanently within this chamber in any suitable form, for example inside a hollow formed in the joint and communicating with the chamber through one or several small ports.

This feature ensures the permanent cleanliness of the gaseous contents of the chamber 3 and prevents, in particular, polluting gases of traffic from being able to penetrate therein and thereby reduce the transparency.

To heat the inside of the said chamber 3 and to facilitate thus the de-icing of the outer surface of the outer sheet 2 and/or the defogging of the inner surface of the inner sheet 1, according to another advantageous feature of the invention, this chamber is encircled by an electrical resistance 13 adapted to be connected to a source of electric current by the closing of an electrical switch easily actuated by the driver.

This resistance 13 is mounted for example in the gasket 4 with the interposition of a stringer of channel element 14, continuous or not, its channel facing the inside of the chamber and constituted at least in part of a thermally insulating material such as for example a ceramic.

Such a resistance could also be connected directly to one of the two facing sheets of glass, inside the chamber 3, in a manner known in itself for the heating of the rear windows of vehicles.

As a result of which, and whatever the embodiment adopted, there is provided a windshield whose constitution and operation emerge sufficiently from the foregoing and which presents, with respect to known windshields, numerous advantages, especially as regards safety, and, for the preferred embodiments, efficiency of de-icing and of defogging and simplicity of control of these operations.

As is self-evident, and as emerges already from the foregoing, the invention is in no way limited to those types of its application and embodiments which have been more especially indicated; it encompasses, on the contrary, all modifications.

I claim:

1. Double safety windshield for a vehicle, said windshield comprising two facing parallel sheets of glass spaced from one another and adapted to be positioned inside and outside respectively relative to the vehicle, an inextensible cable engirdling said outside sheet, and a handle attached to said cable and mountable so as to be easily accessible to a driver inside the vehicle, said cable being arranged so that sudden traction by the driver on said handle ensures the dislocation of said outside sheet after initiation of its breakage, without disturbing said inner sheet, to an extent sufficient to restore the driver's view through the windshield.

2. Windshield according to claim 1, wherein the inextensible cable is of steel.

3. Windshield according to claim 1, wherein the inextensible cable is adapted to be anchored at a point of the rigid frame of the vehicle encircling the windshield, said point being arranged on the side of the frame opposite that at which the cable is attached to the handle.

4. Windshield according to claim 1, wherein the outside sheet has a peripheral portion forming a groove to receive the cable.

5. Windshield according to claim 1, wherein said handle is arranged to be positioned below and to the left of the windshield seen from the inside of the vehicle.

6. Windshield according to claim 1, wherein said sheets of glass are curved outwardly.

7. Windshield according to claim 1, including a flexible sectional element fastened on the peripheral portion of the outer sheet, in which sectional element the cable is housed.

8. Windshield according to claim 7, wherein said sectional element straddles said peripheral position.

9. Windshield according to claim 8, wherein said sectional element is formed of separate links.

10. Windshield according to claim 1, including sealing means for isolating the space comprised between its two sheets permanently from the outside in sealed manner.

11. Windshield according to claim 10, wherein a dehydrating product is disposed in communication with said space.

12. Windshield according to claim 11, wherein said dehydrating product is housed in a cavity in said sealing means.

13. Windshield according to claim 1, including an electrical resistance to heat the space comprised between its two sheets.

14. In a vehicle, having a frame for a windshield, a windshield according to claim 13, wherein the electrical resistance is mounted along the frame so as to be firmly isolated from sealing joints provided between said frame and the glass sheets.

15. Windshield according to claim 14, including a thermally insulating channel element, said channel being open towards the inside of the space separating the two sheets, and said channel element housing said electrical resistance and insulating it from the sealing joints.

* * * * *

UNITED STATES PATENT OFFICE
CERTIFICATE OF CORRECTION

Patent No. 3,807,791        Dated 04/30/74

Inventor(s) Jean Boyer

It is certified that error appears in the above-identified patent and that said Letters Patent are hereby corrected as shown below:

Column 3, line 6, after "two" "rings" should read -runs-.

Signed and sealed this 31st day of December 1974.

(SEAL)
Attest:

McCOY M. GIBSON JR.
Attesting Officer

C. MARSHALL DANN
Commissioner of Patents